(12) United States Patent
Wang et al.

(10) Patent No.: US 8,630,189 B2
(45) Date of Patent: Jan. 14, 2014

(54) METHODS, APPARATUS AND ARTICLES OF MANUFACTURE TO MONITOR TUNNELS WITHIN TRAFFIC ENGINEERING/FAST REROUTE ENABLED NETWORKS

(75) Inventors: Heng Wang, Holmdel, NJ (US); Shiow-Ching Ho, Holmdel, NJ (US); Leah Li Zhang, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 536 days.

(21) Appl. No.: 12/561,780

(22) Filed: Sep. 17, 2009

(65) Prior Publication Data

US 2011/0063985 A1    Mar. 17, 2011

(51) Int. Cl.
*H04L 12/26* (2006.01)
*H04L 12/28* (2006.01)

(52) U.S. Cl.
USPC .......................................... 370/248; 370/254

(58) Field of Classification Search
USPC .................... 370/235, 392, 401, 248, 254
See application file for complete search history.

(56) References Cited

U.S. PATENT DOCUMENTS

| | | | |
|---|---|---|---|
| 5,049,873 A | 9/1991 | Robins et al. | |
| 5,561,769 A | 10/1996 | Kumar et al. | |
| 5,964,837 A | 10/1999 | Chao et al. | |
| 8,023,517 B2 * | 9/2011 | Yang et al. | 370/401 |
| 2006/0221971 A1 * | 10/2006 | Andrieux et al. | 370/392 |
| 2006/0291391 A1 * | 12/2006 | Vasseur et al. | 370/235 |

OTHER PUBLICATIONS

Network Working Group Request for Comments: 3812 Category: Standards Track 'Multiprotocol Label Switching (MPLS) Traffic Engineering (TE) Management Information Base (MIB)' to Srinivasan et al., p. 1-68.*
Huawei Technologies Co., Ltd., "Technical White Paper for MPLS TE Fast Reroute," Copyright 2007 (19 pages).
Srinivasan et al., "Multiprotocol Label Switching (MPLS) Traffic Engineering (TE) Management Information Base (MIB)," Network Working Group, Jun. 2004 (68 pages).
Chao et al., "Event-driven network topology monitoring function," IBM Systems Journal, vol. 35, No. 1, 1996 (12 pages).

* cited by examiner

*Primary Examiner* — Mark Rinehart
*Assistant Examiner* — Gbemileke Onamuti
(74) *Attorney, Agent, or Firm* — Hanley, Flight & Zimmerman, LLC (57) ABSTRACT

Example methods and apparatus to monitor tunnels within traffic engineering/fast reroute (TE/FRR) enabled networks are disclosed. A disclosed example apparatus includes a message interface to receive from a router a change alert notification for a traffic engineering (TE) tunnel, a router interrogator to interrogate the router to obtain updated path information for the TE tunnel in response to the received change alert notification, and a topology database interface to update a database representative of a tunnel topology of a TE/FRR enabled network based on the updated path information.

20 Claims, 5 Drawing Sheets

SNMPv2-SMI::transmission.166.3.2.2.1.22.101.167772276.167772274 = Gauge32: 0
SNMPv2-SMI::transmission.166.3.2.2.1.22.101.167772276.167772274 = Gauge32: 13481

SNMPv2-SMI::transmission.166.3.2.2.1.22.101.167772276.167772274 = Gauge32: 0
SNMPv2-SMI::transmission.166.3.2.2.1.22.101.167772276.167772274 = Gauge32: 13481

Name: transmission.166.3.2.8.1.4.13481.1 -> OCTET STRING - (hex): 0A 00 00 04
Name: transmission.166.3.2.8.1.4.13481.1 -> OCTET STRING - (hex): 0A 00 00 05    } 805
Name: transmission.166.3.2.8.1.4.13481.1 -> OCTET STRING - (hex): 0A 00 00 06
End of requested OID tree

800     FIG. 8

| Head IP | Tunnel-ID | PathSeq | Tunnel Path |
|---|---|---|---|
| 10.0.0.2 | 101 | 1 | 10.0.0.4 |
| 10.0.0.2 | 101 | 2 | 10.0.0.5 |
| 10.0.0.2 | 101 | 3 | 10.0.0.6 |
| ⋮ | | | |
|  |  |  |  |

METHODS, APPARATUS AND ARTICLES OF MANUFACTURE TO MONITOR TUNNELS WITHIN TRAFFIC ENGINEERING/FAST REROUTE ENABLED NETWORKS

FIELD OF THE DISCLOSURE

This disclosure relates generally to traffic engineering/fast reroute (TE/FRR) enabled networks and, more particularly, to methods and apparatus to monitor tunnels within TE/FRR enabled networks.

BACKGROUND

Service providers are increasingly implementing multiprotocol label switching (MPLS) TE/FRR within their networks to improve network convergence times and/or to better utilize network resources. To reduce packet loss due to inefficient bandwidth utilization and/or to improve network performance, TE tunnels are defined through the service provider's MPLS-based network to steer traffic along desired paths. Traffic is forwarded along the defined TE tunnels using label switching. Each communication path between a particular source or headend router and a particular destination or tailend router is assigned a specific label switched path (LSP) identifier within the service provider's network using, for example, resource reservation protocol (RSVP) signaling. Over time, TE tunnel paths within an TE/FRR enabled network may be changed, rerouted and/or re-optimized in response to changed(-ing) network conditions and/or changed(-ing) service provider constraints.

DETAILED DESCRIPTION

Example methods and apparatus to monitor tunnels within traffic engineering/fast reroute (TE/FRR) enabled networks are disclosed. A disclosed example apparatus includes a message interface to receive from a router a change alert notification for a TE tunnel, a router interrogator to interrogate the router to obtain updated path information for the TE tunnel in response to the received change alert notification, and a topology database interface to update a database representative of a tunnel topology of a TE/FRR enabled network based on the updated path information.

A disclosed example method includes receiving from a router a change alert notification for a TE tunnel, interrogating the router to obtain updated path information for the TE tunnel in response to the change alert notification, and updating a database representative of a topology of a network based on the updated path information.

In the interest of brevity and clarity, throughout the following disclosure references will be made to an example TE/FRR enabled network 100 of FIG. 1. However, the methods and apparatus described herein to monitor TE tunnels are applicable to other TE/FRR enabled, and/or other networks constructed using any number and/or type(s) of additional and/or alternative network technologies, topologies and/or protocols. To route data between two endpoint routers (not shown), the example TE/FRR enabled network 100 of FIG. 1 includes a plurality of routers, five of which are designated at reference numerals R0, R1, R2, R3 and R4. The example routers R0-R4 of FIG. 1 may be communicatively coupled in any topology using any number and/or type(s) of communication paths. In some examples, the routers R0-R4 are implemented at different physical locations to allow the example TE/FRR enabled network 100 to route traffic across and/or within a geographical area and/or region.

Using any number and/or type(s) of method(s), protocol(s), criteria and/or logic, TE tunnels (one of which is designated at reference numeral 101) are defined and/or established through the TE/FRR enabled network 100 to facilitate the routing of traffic between locations. Each of the routers R0-R4 may be associated with a plurality of TE tunnels to implement a partial and/or full mesh of TE tunnels among the routers R0-R4. In some examples, a full-mesh of TE tunnels is defined within the network 100 to allow data to be routed between any pairs of the routers R0-R4. The example TE tunnel 101 of FIG. 1 facilitates the transport of data from the router R0 to the router R4.

Each TE tunnel defines a unidirectional virtual interface communicatively coupling a specific source (e.g., a headend router) and a specific destination (e.g., a tailend router), which may have associated properties and/or attributes. In some examples, policies based traffic selection (PBTS) is used to enable and/or disable certain types of traffic flows within a TE tunnel Example attributes associated with a TE tunnel, in addition to the associated ingress (headend router and/or endpoint) and egress (tailend router and/or endpoint) points, include, but are not limited to, a bandwidth requirement and/or a cost-of-service (CoS) associated with forwarding data along that TE tunnel. In the example of FIG. 1, traffic is forwarded along the path defined by the associated TE tunnel using MPLS-based label switching. Using, for example, a resource reservation protocol (RSVP), a headend router assigns a label switching path (LSP) identifier to each TE tunnel associated with a particular path. A TE tunnel need not be bound to a specific or fixed path through the network 100. Unless configured explicitly, the path associated with a particular TE tunnel can be changed, rerouted and/or re-optimized to direct packets along a different path through the network 100. For example, the TE tunnel 101 may be changed to route data between the routers R0 and R4 via a new path 105 that includes the routers R3 and R2 rather than via a previous path 106 that includes the routers R1 and R2, as shown in FIG. 1. In some examples, the new path 105 may be a pre-calculated path for the path 106 to facilitate sub-second link failure recovery.

In TE/FRR enabled networks, TE tunnel paths may change dynamically in response to, for example, network conditions such as, communication link failure, router failure, router interface failure, etc. Network engineers often analyze and/or study the topology of a network to detect and/or identify, for example, bottle necks, communication link failures, router failures, interface failures, etc. However, to perform such tunnel and/or network topology analysis, the network engineers require accurate and current TE tunnel path information. Because the TE tunnel paths change dynamically, tunnel topology information can easily become out of date and/or unrepresentative of current network conditions. Further, while periodic and/or aperiodic polling of all of the routers of a network can be performed to obtain current TE tunnel path information, such polling is inefficient and may not result in tunnel topology information that is, at any point in time, representative of the current state of an entire network.

Figure 1:
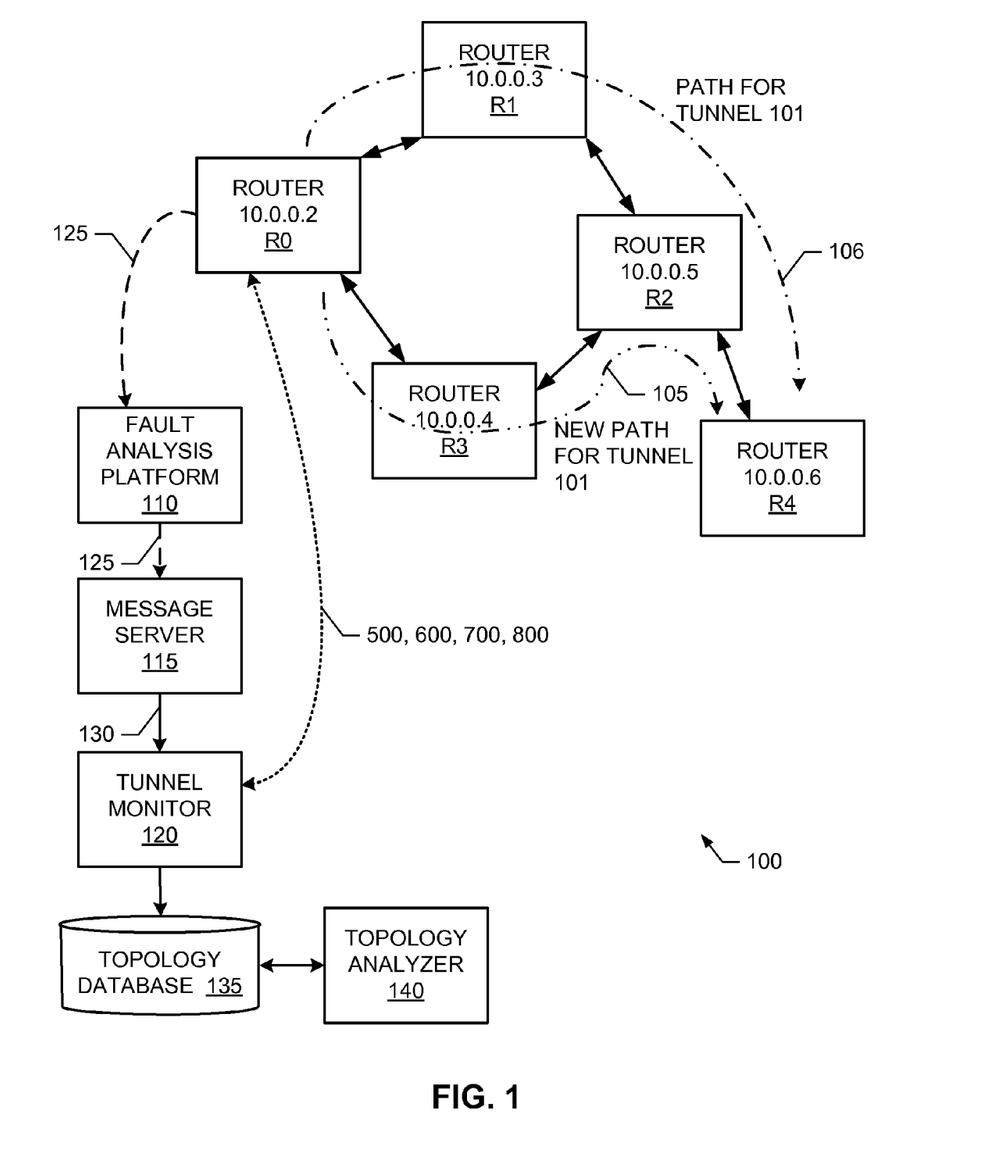
FIG. 1 is a schematic illustration of an example TE/FRR enabled network constructed in accordance with the teachings of this disclosure.

To overcome at least these difficulties in monitoring TE tunnels and/or, more generally, the state of the network 100 in substantially real-time, the example network 100 of FIG. 1 includes a fault analysis platform 110, a message server 115, and a tunnel monitor 120. Whenever the path of a TE tunnel through the network 100 is re-routed, changed and/or re-optimized, the corresponding headend router traps and/or triggers on the TE tunnel path change and sends a tunnel path change alert notification. For example, when the router R0 detects that the path of the TE tunnel 101 changed from the path 106 to the path 105, the router R0 sends a tunnel path change alert notification 125. In some examples, the router R0 traps and/or triggers based on an mplsTunnelRerouted event and/or an mplsTunnelReoptimized event, as defined in Internet Engineering Task Force (IETF) Request for Comment (RFC) 3812.

In the illustrated example of FIG. 1, the tunnel path change alert notification 125 is received at the example fault analysis platform 110. In general, the example fault analysis platform 110 of FIG. 1 handles any number and/or type(s) of additional and/or alternative fault and/or alert messages received from the routers R0-R4 according to any number and/or type(s) of rule(s), logic and/or criteria. When the example fault analysis platform 110 receives a tunnel path change alert notification, such as the example notification 125, the fault analysis platform 110 routes the change alert notification to the example message server 115. While the example fault analysis platform 110 is depicted in FIG. 1 with a single box, the fault analysis platform 110 may include any number and/or type(s) of server(s), device(s), data collector(s), alert filtering module (s) and/or messaging interface(s).

The example message server 115 of FIG. 1 transforms the TE tunnel path change alert notification 125 sent by the router R0 into an eXtensible Markup Language (XML) formatted TE tunnel change alert notification 130, and places the XML-formatted TE tunnel change alert notification 130 into a message queue 210 (FIG. 2) of the tunnel monitor 120. An example data structure that may be used to implement the example message XML-formatted change alert notification 130 is shown in FIG. 3.

Figure 3:
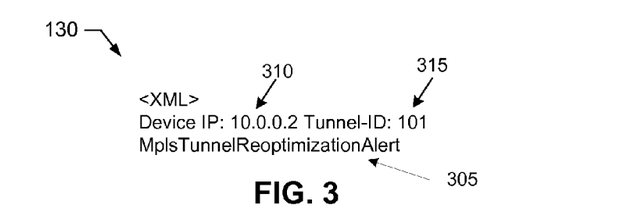
FIG. 3 illustrates an example tunnel change alert notification.

To identify that the example notification 130 of FIG. 3 is a TE tunnel change alert notification, the example TE tunnel change alert notification 130 of FIG. 3 includes a message type field 305. The example message type field 305 of FIG. 3 contains one or more alphanumeric characters that indicate a TE tunnel change alert, such as the term "MplsTunnelReoptimizationAlert."

To identify the router R0-R3 that sent the TE tunnel change alert notification 125 corresponding to the notification 130, the example change alert notification 130 of FIG. 3 includes an Internet protocol (IP) address field 310. The example IP address field 310 of FIG. 3 contains one or more numbers that represent an IP address.

To identify the TE tunnel that changed, the example TE tunnel change alert notification 130 includes a tunnel ID field 315. The example tunnel ID field 315 of FIG. 3 includes one or more alphanumeric characters that uniquely identify a TE tunnel of the network 100.

While an example data structure that may be used to implement the example TE tunnel change alert notification 130 of FIG. 1 is illustrated in FIG. 3, the example XML-formatted TE tunnel change alert notification 130 of FIG. 3 may be implemented using any number and/or type(s) of other and/or additional entries, fields and/or data. Further, the entries, fields and/or data illustrated in FIG. 3 may be combined, divided, re-arranged, eliminated and/or implemented in any way. Further still, the example XML-formatted TE tunnel change alert notification 130 may include entries, fields and/or data in addition to, or instead of, those illustrated in FIG. 3, and/or may include more than one of any or all of the illustrated entries, fields and/or data.

Returning to FIG. 1, while in the illustrated example of FIG. 1, the message server 115 places the TE tunnel path change alert notification 130 in the message queue 210 of the tunnel monitor 120, the example message server 115 of FIG. 1 could, additionally or alternatively, send an interrupt to the tunnel monitor 120 that causes the tunnel monitor 120 to process the change alert notification 130. Moreover, the message server 115 could be eliminated and the fault analysis platform 110 may send the change alert notification 125 directly to the tunnel monitor 120 when it is received from the router R0.

The example tunnel monitor 120 of FIG. 1 periodically or aperiodically checks the message queue 210 for unprocessed TE tunnel path change alert notifications 130. In some examples, the tunnel monitor 120 processes alert notifications 130 on a first-come first-served basis. As described in more detail below in connection with FIGS. 2-10, the example tunnel monitor 120 of FIG. 1 processes each change alert notification 130 by interrogating the router R0-R4 that sent the corresponding alert notification 125 to obtain from that router R0-R4 the new and/or updated path information for the affected TE tunnel. In some examples, the tunnel monitor 120 interrogates the router R0-R4 by exchanging simple network management protocol (SNMP) messages with the router R0-R4 to request and/or obtain information from a MPLS TE management information block (MIB), as defined in, for example, IETF RFC 3812. Based on TE tunnel path information received, obtained and/or otherwise collected from the router R0-R4, the example tunnel monitor 120 updates a tunnel and/or network topology database 135. By interrogating the router R0-R4 to collect and/or obtain TE tunnel path information when a TE tunnel path change occurs, rather than based on periodic or aperiodic polling, the example tunnel monitor 120 can update the tunnel and/or network topology database 135 in substantially real-time as each TE tunnel path change occurs. Thus, at each time instant, the example network topology database 135 can substantially represent the current and/or active TE tunnel paths of the network 100. Accordingly, the example tunnel and/or network topology database 135 of FIG. 1 is kept more up-to-date than previously existing network topology databases and, thus, more amenable to accurate analysis by a topology analyzer 140 and/or a network engineer.

An example data structure that may be used to implement the example tunnel topology database 135 of FIG. 1 is described below in connection with FIG. 9. The example tunnel topology database 135 may be stored on any number and/or type(s) of memory(-ies), memory device(s) and/or storage device(s).

To identify network conditions such as, for example, over utilized communication links, bottlenecks, communication link failures, router failures, router interface failures, etc., the example network 100 of FIG. 1 includes any number and/or type(s) of topology analyzers, one of which is designated at reference numeral 140. The example topology analyzer 140 of FIG. 1 may identify one or more TE tunnels having a common previous communication link and/or router that is no longer part of the path(s) of the identified TE tunnels. Such a common no longer used communication link and/or router may be indicative of a failed and/or failing portion of the network 100. By proactively identifying such network failures, repair can be affected before customers become aware that a network failure occurred, thereby increasing customer satisfaction and/or reducing lost revenue. The tunnel topology database 135 may also be analyzed by the example topology analyzer 140 to identify portions of the network 100 that would benefit from capacity upgrade(s) to, for example, improve network performance and/or reliability.

While an example TE/FRR enabled network 100 has been illustrated in FIG. 1, one or more of the interfaces, data structures, elements, processes and/or devices illustrated in FIG. 1 may be combined, divided, re-arranged, omitted, eliminated and/or implemented in any other way. For example, the tunnel monitor 120 may be implemented by and/or within the example fault analysis platform 110, the message server 115 may be eliminated, and/or the message queue 210 may be eliminated. Further, the example fault analysis platform 110, the example message server 115, the example tunnel monitor 120 and/or the topology analyzer 140 of FIG. 1 may be implemented by hardware, software, firmware and/or any combination of hardware, software and/or firmware. Thus, for example, any of the example fault analysis platform 110, the example message server 115, the example tunnel monitor 120 and/or the topology analyzer 140 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the network 100 may include communication links, servers, platforms, monitors, data structures and/or devices instead of, or in addition to, those illustrated in FIG. 1 and/or may include more than one of any or all of the illustrated communication links, servers, platforms, monitors, data structures and/or devices.

Figure 2:
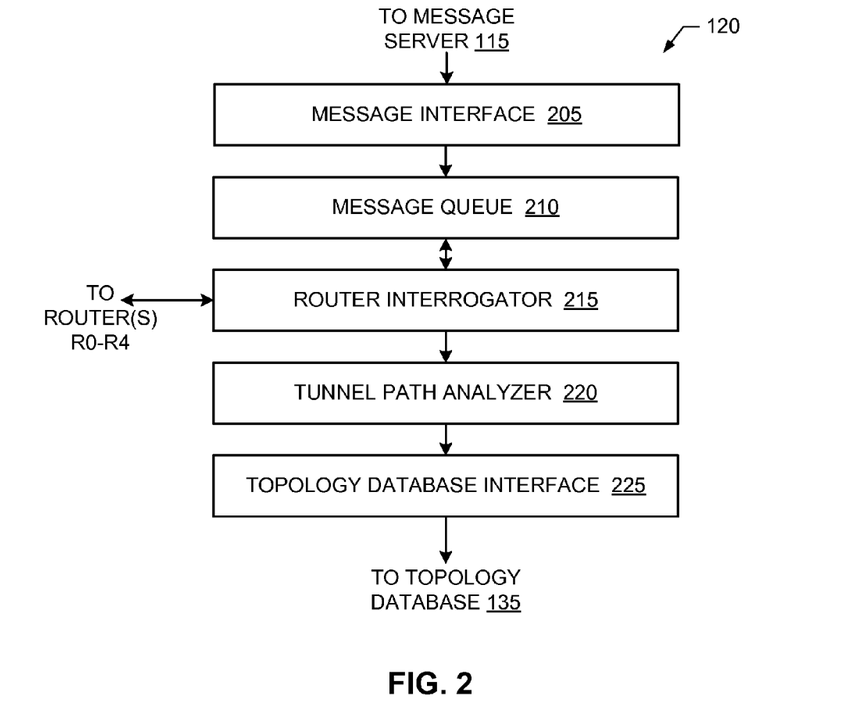
FIG. 2 illustrates an example manner of implementing the example tunnel monitor of FIG. 1.

FIG. 2 illustrates an example manner of implementing the example tunnel monitor 120 of FIG. 1. To receive TE tunnel change alert notifications 130, the example tunnel monitor 120 of FIG. 2 includes a message interface 205. The example message interface 205 receives TE tunnel change alert notifications 130 from the example message server 115 of FIG. 1 and places them in the example message queue 210. In some examples, when a TE tunnel change alert notification 130 is received, the message interface 205 sends an interrupt to a router interrogator 215 rather than placing TE tunnel change alert notifications 130 in the message queue 210.

Figure 4:
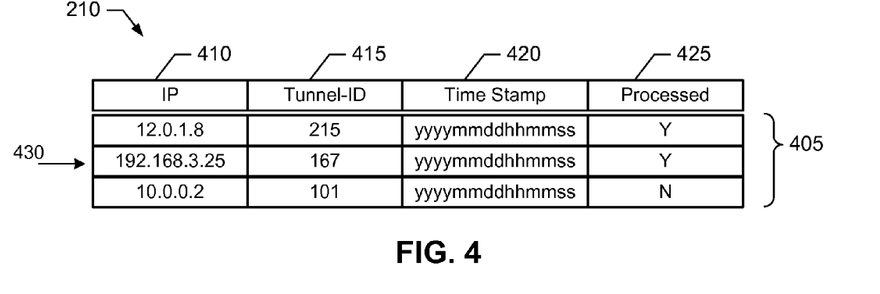
FIG. 4 illustrates an example data structure that may be used to implement the example message queue of FIG. 2.

An example data structure that may be used to implement the example message queue 210 of FIG. 2 is shown in FIG. 4. The example message queue 210 may be stored on any number and/or type(s) of memory(-ies), memory device(s) and/or storage device(s).

The example message queue 210 of FIG. 4 includes a plurality of entries 405 for respective ones of a plurality of TE tunnel change alert notifications 130 received via the example message interface 205. As shown in FIG. 4, an example entry 430 corresponds to the example TE tunnel change alert notification 130 of FIG. 3.

To identify the router R0-R3 that sent the corresponding TE tunnel change alert notification 130, each of the example entries 405 of FIG. 4 includes an IP address field 410. Each of the example IP address fields 410 of FIG. 4 contains one or more numbers that represent an IP address.

To identify the TE tunnel that changed, each of the example entries 405 of FIG. 4 includes a tunnel ID field 415. Each of the example tunnel ID fields 415 of FIG. 4 contains one or more alphanumeric characters that uniquely identify a TE tunnel of the network 100.

To identify when the TE tunnel change alert notification was received, each of the example entries 405 of FIG. 4 includes a timestamp field 420. Each of the example timestamp fields 420 of FIG. 4 contains one or more alphanumeric characters that represent a timestamp. An example timestamp format is shown in FIG. 4.

To indicate whether the TE tunnel change alert notification has been processed, each of the example entries 405 of FIG. 4 includes a processed field 425. Each of the example processed fields 425 of FIG. 4 contains one or more alphanumeric characters that one of two logic values, such as 'yes' or 'no,' or 'true' or 'false.'

While an example data structure that may be used to implement the example message queue 210 of FIG. 2 is illustrated in FIG. 4, the example message queue 210 of FIG. 4 may be implemented using any number and/or type(s) of other and/or additional entries, fields and/or data. Further, the entries, fields and/or data illustrated in FIG. 4 may be combined, divided, re-arranged, eliminated and/or implemented in any way. Further still, the example message queue 210 may include entries, fields and/or data in addition to, or instead of, those illustrated in FIG. 4, and/or may include more than one of any or all of the illustrated entries, fields and/or data.

Returning to FIG. 2, to receive, obtain and/or otherwise collect TE tunnel path change information from the routers R0-R4, the example tunnel monitor 120 of FIG. 2 includes the example router interrogator 215. The example router interrogator 215 of FIG. 2 processes each TE tunnel change alert notification 130 in the message queue 210 by sending a first SNMP query message 500 (FIG. 5) to the corresponding router R0-R4 to request the index of the Tunnel Computed Route Hop Table for the changed TE tunnel 101. The example SNMP message 500 of FIG. 5 contains a first portion 505 that references the MplsTunnelARHopTableIndex of the router's's MPLS TE MIB and a second portion 510 that identifies the TE tunnel 101. The example SNMP message 500 corresponds to the example TE tunnel change alert notification 130 of FIG. 3 and the corresponding unprocessed entry 430 of FIG. 4.

Figure 5:
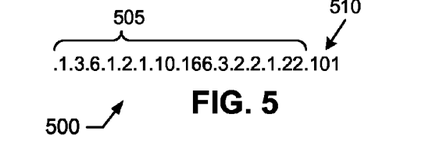
FIGS. 5-8 illustrate example messages that may be exchanged between a router and the example tunnel monitors of FIGS. 1 and 2 to obtain updated TE tunnel path information from the router.
Figure 6:
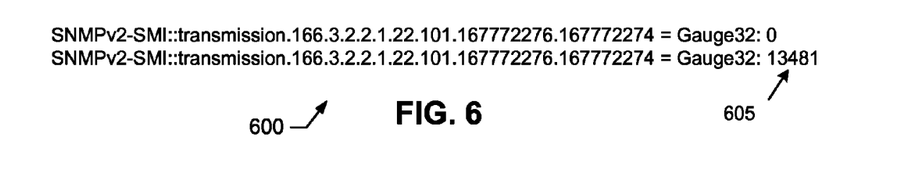

The router interrogator 210 of FIG. 2 waits to receive a response to the example SNMP message 500 of FIG. 5 from the interrogated router R0-R4. An example response SNMP message 600 to the SNMP query 500 is shown in FIG. 6. The example SNMP response message 600 of FIG. 6 contains, among other things, the requested TableIndex 605 for the changed TE tunnel 101. The example router interrogator 210 of FIG. 2 extracts the TableIndex 605 from the example response message 600.

Figure 7:
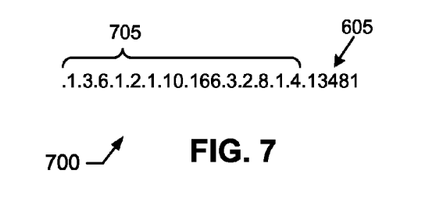

Using the extracted TableIndex 605, the example router interrogator 210 requests the TE tunnel path information for the changed TE tunnel 101 by sending a second SNMP query message 700 (FIG. 7). The example SNMP message 700 of FIG. 7 contains a first portion 705 that references the MplsTunnelARHopTable of the routers's MPLS TE MIB and a second portion containing the TableIndex 605.

Figure 8:
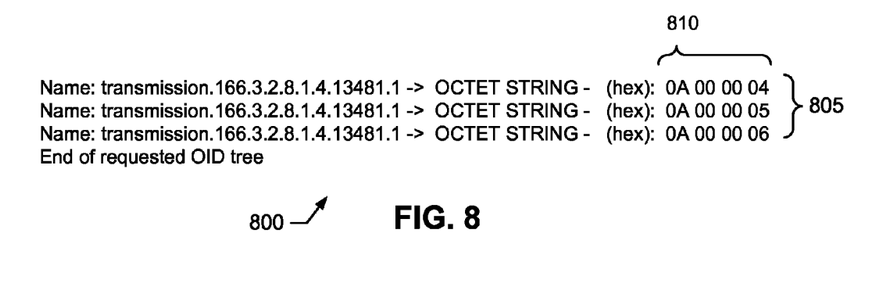

The router interrogator 210 of FIG. 2 waits to receive a response to the second SNMP query message 700 from the interrogated router R0-R4. An example response SNMP message 800 to the SNMP query 700 is shown in FIG. 8. The example SNMP response message 800 of FIG. 8 includes a plurality of entries 805 corresponding to each hop of the changed TE tunnel path. To identify the next hop of the TE tunnel path, each of the example entries 805 of FIG. 8 includes an IP address field 810. Each of the example IP address fields 810 of FIG. 8 contains one or more numbers that represent an IP address. The example router interrogator 215 provides the response SNMP message 800 to a tunnel path analyzer 220.

The example tunnel path analyzer 220 of FIG. 2 parses the example TE tunnel path information message 800 to extract each of the IP addresses 810. A topology database interface 225 stores the extract TE tunnel path information in the example tunnel topology database 135 of FIG. 1. Implementation of the database interface 225 of FIG. 2 may depend on the application programming interface (API) implemented by the example tunnel topology database 135. An example API includes a structured query language (SQL).

While an example manner of implementing the example tunnel monitor 120 of FIG. 1 has been illustrated in FIG. 2, one or more of the interfaces, data structures, modules, elements and/or devices illustrated in FIG. 2 may be combined, divided, re-arranged, omitted, eliminated and/or implemented in any other way. Further, the example message interface 205, the example message queue 210, the example router interrogator 215, the example tunnel path analyzer 220, the example topology database interface 225 and/or, more generally, the example tunnel monitor 120 of FIG. 2 may be implemented by hardware, software, firmware and/or any combination of hardware, software and/or firmware. Thus, for example, any of the example message interface 205, the example message queue 210, the example router interrogator 215, the example tunnel path analyzer 220, the example topology database interface 225 and/or, more generally, the example tunnel monitor 120 may be implemented by one or more circuit(s), programmable processor(s), ASIC(s), PLD(s) and/or FPLD(s), etc. Further still, the tunnel monitor 120 may include interfaces, data structures, modules, elements and/or devices instead of, or in addition to, those illustrated in FIG. 2 and/or may include more than one of any or all of the illustrated interfaces, data structures, modules, elements and/or devices.

While example SNMP messages 500, 600, 700 and 800 that may be exchanged between the example tunnel monitor 120 and any of the example routers R0-R4 to interrogate the routers R0-R4 to obtain and/or collect TE tunnel path information are illustrated in FIGS. 5-8, the example SNMP messages 500, 600, 700 and 800 may be implemented using any number and/or type(s) of other and/or additional entries, fields and/or data. Further, the entries, fields and/or data illustrated in FIGS. 5-8 may be combined, divided, re-arranged, eliminated and/or implemented in any way. Further still, any of the example messages 500, 600, 700 and 800 of FIGS. 5-8 may include entries, fields and/or data in addition to, or instead of, those illustrated in FIGS. 5-8, and/or may include more than one of any or all of the illustrated entries, fields and/or data.

Figure 9:
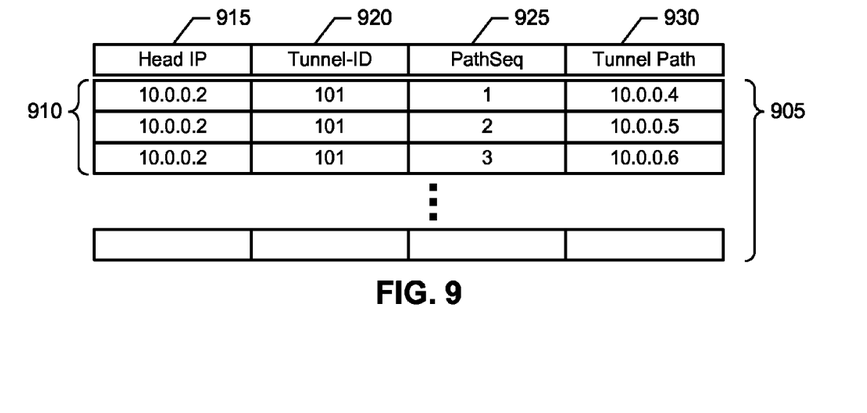
FIG. 9 illustrates an example data structure that may be used to implement the example tunnel and/or network topology database of FIG. 1.

An example data structure that may be used to implement the example network and/or tunnel topology database 135 of FIG. 1 is shown in FIG. 9. The example data structure of FIG. 9 includes a plurality of entries 905 for respective ones of a plurality of TE tunnel hops. In the example of FIG. 9, a portion 910 of the entries 905 corresponds to the new TE tunnel path information for TE tunnel 101 extracted from the response message 800 of FIG. 8.

To identify the headend router R0-R3 for a TE tunnel, each of the example entries 905 of FIG. 9 includes a Head IP address field 915. Each of the example Head IP address fields 905 of FIG. 9 contains one or more numbers that represent an IP address.

To identify a TE tunnel, each of the example entries 905 of FIG. 9 includes a tunnel ID field 920. Each of the example tunnel ID fields 920 of FIG. 9 contains one or more alphanumeric characters that uniquely identify a TE tunnel of the network 100.

As shown in FIG. 9, each hop of a TE tunnel is given a numeric path sequence number 925. For example, the entries 905 of the example portion 910 are numbered sequentially as 1, 2 and 3 corresponding to the $1^{st}$, $2^{nd}$ and $3^{rd}$ hops of the TE tunnel 101.

To identify the next router R0-R3 of a TE tunnel, each of the example entries 905 of FIG. 9 includes tunnel path IP address field 930. Each of the example tunnel path IP address fields 930 of FIG. 9 contains one or more numbers that represent an IP address.

While an example data structure that may be used to implement the example network and/or tunnel topology database 135 of FIG. 1 is illustrated in FIG. 9, the example topology database 135 of FIG. 9 may be implemented using any number and/or type(s) of other and/or additional entries, fields and/or data. Further, the entries, fields and/or data illustrated in FIG. 9 may be combined, divided, re-arranged, eliminated and/or implemented in any way. Further still, the example topology database 135 may include entries, fields and/or data in addition to, or instead of, those illustrated in FIG. 9, and/or may include more than one of any or all of the illustrated entries, fields and/or data.

Figure 10:
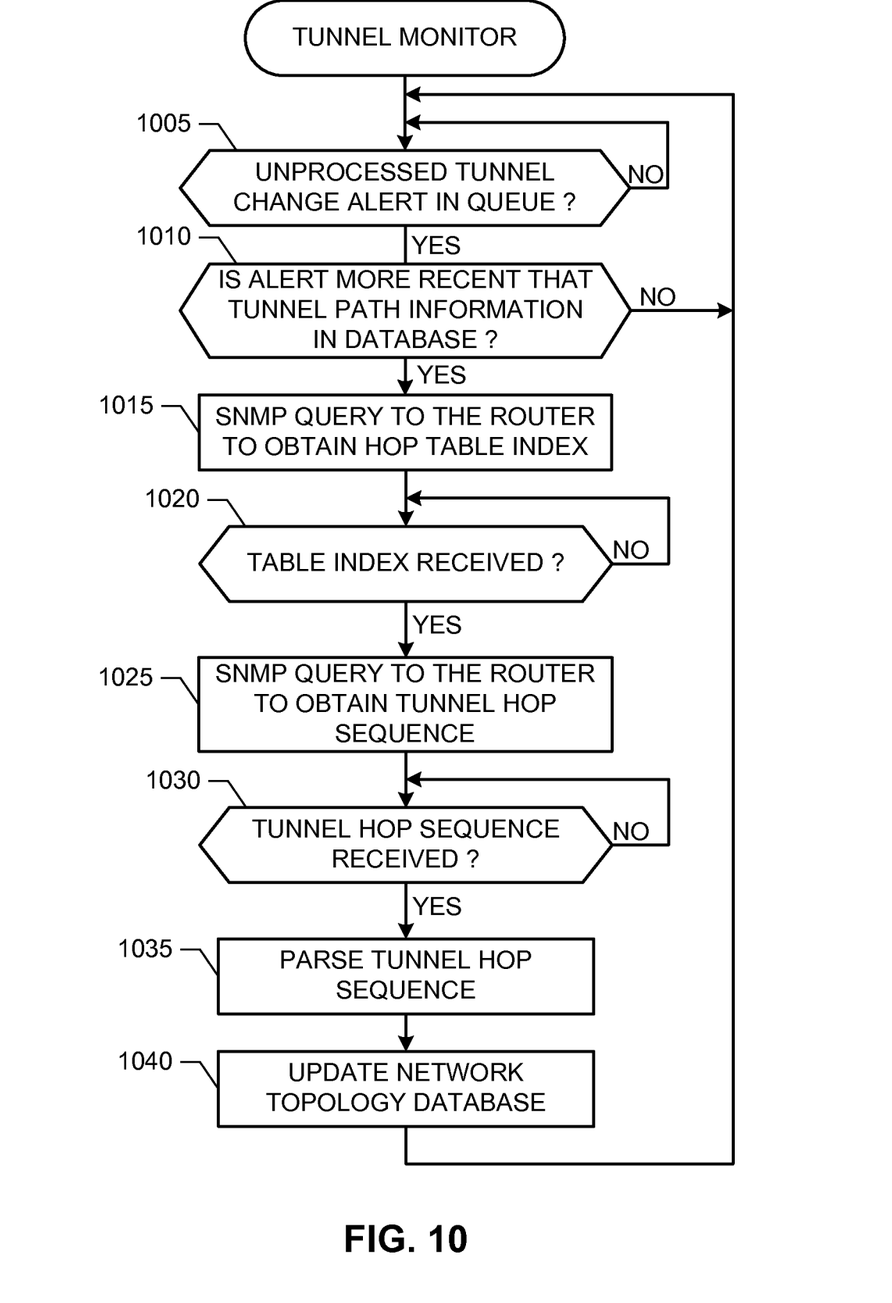
FIG. 10 is a flowchart representative of an example process that may be carried out to implement the example tunnel monitor of FIGS. 1 and 2.

FIG. 10 illustrates is a flowchart representative of an example process that may be carried out to implement the example tunnel monitor 120 of FIGS. 1 and 2. The example process of FIG. 10 may be carried out by a processor, a controller and/or any other suitable processing device. For example, the example process of FIG. 10 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 11). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example process of FIG. 10 may be implemented using any combination(s) of ASIC(s), PLD(s), FPLD(s), discrete logic, hardware, firmware, etc. Also, some or all of the example process of FIG. 10 may instead be implemented manually or as any combination of any of the foregoing techniques, for example, any combination of firmware, software, discrete logic and/or hardware. Further, many other methods of implementing the example operations of FIG. 10 may be employed. For example, the order of execution of the blocks may be changed, and/or one or more of the blocks described may be changed, eliminated, sub-divided, or combined. Additionally, any or all of the example process of FIG. 10 may be carried out sequentially and/or carried out in parallel by, for example, separate processing threads, processors, devices, discrete logic, circuits, etc.

The example process of FIG. 10 begins with the example router interrogator 215 waiting for a TE tunnel change alert notification 130 to be received via the message interface 205 (block 1005). When there is a TE tunnel change alert notification 130 for a TE tunnel to be processed (block 1005), the router interrogator 215 determines whether the received notification 130 is more recent than the TE tunnel path information stored in the topology database 135 for that TE tunnel (block 1010). If the received TE tunnel change alert notification 130 does not correspond to more recent TE tunnel path information (block 1010), control returns to block 1005 to process another TE tunnel change alert notification 130.

If the received TE tunnel change alert notification 130 corresponds to more recent TE tunnel path information (block 1010), the router interrogator 215 sends an SNMP query message, such as the example message 500 of FIG. 5, to request the Hop Table Index for the changed TE tunnel (block 1015). The router interrogator 215 waits for a response message, such as the example response message 600 of FIG. 6 (block 1020).

When a response message is received (block 1020), the router interrogator 215 sends a second SNMP query message, such as the example message 700 of FIG. 7, to request the Hop Table for the changed TE tunnel (block 1025). The router interrogator 215 waits for a second response message, such as the example response message 800 of FIG. 8 (block 1030).

When the response to the second SNMP query message is received (block 1030), the example tunnel path analyzer 220 parses the received response to extract the TE tunnel path information (block 1035), and the database interface 225 stores the extracted TE tunnel path information in the topology database 135 (block 1040). Control then returns to block 1005 to process another TE tunnel change alert notification 130.

Figure 11:
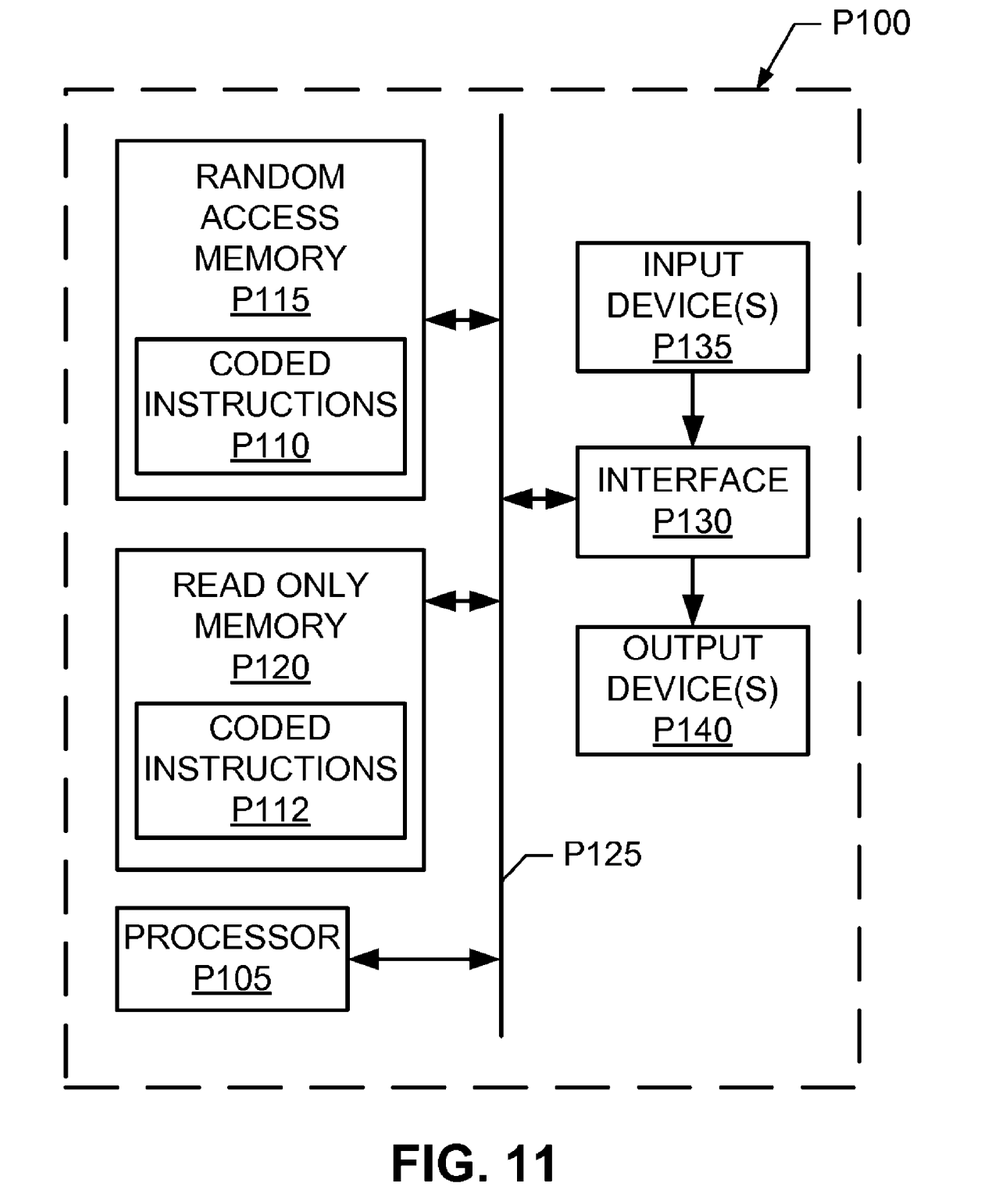
FIG. 11 is a schematic illustration of an example processor platform that may be used and/or programmed to carry out the example process of FIG. 10 and/or to implement any of all of the methods and apparatus disclosed herein.

FIG. 11 is a schematic diagram of an example processor platform P100 that may be used and/or programmed to implement any of the example routers R0-R3, the example fault platform analysis 110, the example message server 115, the example tunnel monitor 120 and/or the example topology analyzer 140 of FIGS. 1 and 2. For example, the processor platform P100 can be implemented by one or more general-purpose processors, processor cores, microcontrollers, etc.

The processor platform P100 of the example of FIG. 11 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 10 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example topology database 135 of FIG. 1 and/or the example message queue 210 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example message interface 205 and/or the example database interface 225 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a memory storing machine readable instructions;
a processor to execute the instructions to perform operations comprising:
identifying a router as a sender of a received change alert notification for a traffic engineering tunnel, the change alert notification being indicative of updated path information for the traffic engineering tunnel being available;
in response to receiving the change alert notification, conveying a first query message to the router identified as the sender of the change alert notification to request a table index of the router;
in response to receiving the table index, conveying a second query message to the router including the table index to request the updated path information for the traffic engineering tunnel; and
updating a database representative of a tunnel topology of a network based on the updated path information.

2. An apparatus as defined in claim 1, wherein the operations further comprise parsing a response message received from the router to extract the updated path information.

3. An apparatus as defined in claim 1, wherein the operations further comprise storing the change alert notification in a message queue, and polling the message queue for the change alert notification.

4. An apparatus as defined in claim 1, wherein the first query message comprises a simple network management protocol message.

5. An apparatus as defined in claim 1, wherein the second query message includes a reference to a multiprotocol label switching traffic engineering management information block of the router identified as the sender of the change alert notification.

6. An apparatus as defined in claim 1, wherein the change alert notification comprises at least one of an mplsTunnelReoptimized message or an mplsTunnelRerouted message.

7. An apparatus as defined in claim 1, wherein the first query message includes an identifier of the traffic engineering tunnel for which the updated path information is available.

8. A method comprising:
identifying, via a logic circuit, a router as a sender of a received change alert notification for a traffic engineering tunnel, the change alert notification being indicative of updated path information for the traffic engineering tunnel being available;

in response to receiving the change alert notification, conveying, via the logic circuit, a first query message to the router identified as the sender of the change alert notification to request a table index of the router;

in response to receiving the table index, conveying a second query message to the router including the table index to request the updated path information for the traffic engineering tunnel; and updating a database representative of a tunnel topology of a network based on the updated path information.

9. A method as defined in claim 8, further comprising parsing a response message received from the router to extract the updated path information.

10. A method as defined in claim 8, wherein the first query message comprises a simple network management protocol message.

11. A method as defined in claim 8, further comprising:
storing the change alert notification in a queue; and
polling the queue for the change alert notification.

12. A method as defined in claim 8, wherein the second query message includes a reference to a multiprotocol label switching traffic engineering management information block of the router identified as the sender of the change alert notification.

13. A method as defined in claim 8, wherein the change alert notification comprises at least one of an mplsTunnelReoptimized message or an mplsTunnelRerouted message.

14. A method as defined in claim 8, wherein the first query message includes an identifier of the traffic engineering tunnel for which the updated path information is available.

15. A tangible machine-readable storage device or disc comprising instructions that, when executed, cause a machine to perform a method comprising:

identifying a router as a sender of a received change alert notification for a traffic engineering tunnel, the change alert notification being indicative of updated path information for the traffic engineering tunnel being available;

in response to receiving the change alert notification, conveying a first query message to the router identified as the sender of the change alert notification to request a table index of the router;

in response to receiving the table index, conveying a second query message to the router including the table index to request the updated path information for the traffic engineering tunnel; and updating a database representative of a tunnel topology of a network based on the updated path information.

16. A storage device or disc as defined in claim 15, wherein the method further comprises parsing a response message received from the router to extract the updated path information.

17. A storage device or disc as defined in claim 15, wherein the first query message comprises a simple network management protocol message.

18. A storage device or disc as defined in claim 15, wherein the method further comprises:
storing the change alert notification in a queue; and
polling the queue for the change alert notification.

19. A storage device or disc as defined in claim 15, wherein the second query message includes a reference to a multiprotocol label switching traffic engineering management information block of the router identified as the sender of the change alert notification.

20. A storage device or disc as defined in claim 15, wherein the first query message includes an identifier of the traffic engineering tunnel for which the updated path information is available.

* * * * *